United States Patent [19]

Guile et al.

[11] Patent Number: 5,716,899
[45] Date of Patent: Feb. 10, 1998

[54] PORE-IMPREGNATED BODY AND METHOD OF PRODUCING SAME

[75] Inventors: Donald L. Guile, Horseheads; Jimmie L. Williams, Painted Post, both of N.Y.

[73] Assignee: Corning Incorporated, Corning, N.Y.

[21] Appl. No.: 495,127

[22] Filed: Jun. 27, 1995

Related U.S. Application Data

[63] Continuation-in-part of Ser. No. 136,136, Oct. 15, 1993, abandoned.

[51] Int. Cl.[6] ............................................. B01J 21/04
[52] U.S. Cl. ............... 502/439; 502/417; 502/60; 502/62; 502/87; 502/514; 423/239.2
[58] Field of Search ........................ 502/60, 62, 87, 502/417, 439, 514; 423/239.2

[56] References Cited

U.S. PATENT DOCUMENTS

| | | | |
|---|---|---|---|
| 2,742,437 | 4/1956 | Houdry | 252/455 |
| 3,824,196 | 7/1974 | Benbow et al. | 252/455 R |
| 3,885,977 | 5/1975 | Lachman et al. | 106/62 |
| 4,039,482 | 8/1977 | Hoyer et al. | 252/466 |
| 4,127,691 | 11/1978 | Frost et al. | 428/116 |
| 4,157,375 | 6/1979 | Brown et al. | |
| 4,208,454 | 6/1980 | Reed et al. | 427/238 |
| 4,550,034 | 10/1985 | Shimrock et al. | 427/243 |
| 4,657,880 | 4/1987 | Lachman et al. | 502/64 |
| 4,758,272 | 7/1988 | Pierotti et al. | 75/246 |
| 4,992,233 | 2/1991 | Swaroop et al. | 419/2 |

FOREIGN PATENT DOCUMENTS

| | | |
|---|---|---|
| 0 057 416 | 8/1982 | European Pat. Off. . |
| 0 095 941 | 12/1983 | European Pat. Off. . |
| 0 370 222 | 5/1990 | European Pat. Off. . |
| 488716A1 | 11/1991 | European Pat. Off. . |

*Primary Examiner*—Michael Lewis
*Assistant Examiner*—Thomas G. Dunn Jr.
*Attorney, Agent, or Firm*—L. Rita Quatrini

[57] ABSTRACT

A body made up of substantially continuous high strength multicellular support having porous cell walls, and pores in the cell walls having an average pore diameter of which have active material embedded therein, and an outer surface. The body is made of material which can be ceramics, glass, glass-ceramic, cermet, metal, oxides, and combinations of these. The active material can be molecular sieve, activated carbon, and combinations these. A method for producing a pore-impregnated body which involves providing the substrate having a wall porosity greater than about 45% by volume, and an average pore diameter of about 15 to 30 micrometers, providing a slurry of active material dispersed in a medium, contacting the support with the slurry at subatmospheric pressure to substantially fill the open pores of the substrate with the active material, removing excess slurry from the outer surface and the non-pore surfaces of the cell walls, followed by drying.

6 Claims, 2 Drawing Sheets

PORE-IMPREGNATED BODY AND METHOD OF PRODUCING SAME

This application is a continuation-in-part of application Ser. No. 08/136,136, filed Oct. 15, 1993, now abandoned.

This invention relates to a body made up of a continuous high strength porous support or substrate having active material embedded in its pores, and to a method of producing the body. The body is especially suited for use as a device for use in catalyst and hydrocarbon adsorption applications.

BACKGROUND OF THE INVENTION

The conventional ceramic monolithic catalyst consists of a ceramic substrate with a coating of high surface area material upon which a catalyst metal is deposited. In particular, the ceramic substrate is normally prepared by sintering a mold of clay or other ceramic material at a high temperature to impart density and strength. This procedure normally results in a very small surface area, and consequently the ceramic must be coated with another material having a higher surface area, as well as specific chemical characteristics on which to actually deposit the catalyst. This procedure of depositing a high surface area "washcoat" on the low surface area ceramic wall is disclosed, for example, in U.S. Pat. Nos. 2,742,437 and 3,824,196.

Catalyst substrates of this kind suffer from several disadvantages. In service, the substrates are exposed to a flow of gases which often contain dusts or particulate matter, which can cause the high surface area coating to flake off the underlying ceramic substrate. This phenomenon can also occur where the substrate is exposed to thermal cycling because the washcoat and the underlying ceramic material often have different thermal expansion coefficients.

Both zeolites and activated carbon have found use in hydrocarbon adsorption applications such as in automotive exhaust conversion, especially hydrocarbons which are emitted during the cold start period of automotive engine operation. Emission standards for these hydrocarbons are becoming ever more stringent. In these applications zeolites and activated carbon are used in conjunction with three-way catalysts.

These materials are often provided in the form of extruded bodies such as honeycombs. These materials do not form good bonds by themselves and require the use of binders to provide strength to extruded honeycombs. The binders can be inorganic or organic.

With carbon bodies, organic binders are typically used and these binders can block the adsorption sites because they are not burned out, thus reducing their effectiveness as adsorbers. Also with organic binders, the strength of the body is still relatively low, and if heated above the decomposition or degradation temperature of the binder, the strength is lost.

Zeolite bodies are advantageously used in higher temperature applications than activated carbon bodies can be used. This results in loss of organic binders if they are used. Inorganic binders are used to add strength. They can block adsorption sites, if used in high amounts.

U.S. Pat. No. 4,657,880 relates to ceramic catalyst supports which have a discrete high surface area phase incorporated within the ceramic matrix. The high surface area phase and the materials which are to form the support phase are formed into a body which is thereafter sintered to form the high strength continuous phase. One disadvantage of this procedure is that adsorbing agents such as carbon, which oxidizes at temperatures below the sintering temperature, cannot be used. If activated carbon were added to the extrusion batch, it would oxidize in air at the firing temperatures and could prevent the sintering and bonding of the host composition. The use of zeolites would also limit the firing temperature in order to prevent surface area loss in the zeolite.

U.S. Pat. No. 4,039,482 to Hoyer et al., U.S. Pat. No. 4,208,454 to Reed et al., and U.S. Pat. No. 4,550,034 to Shimrock et al relate to various techniques of washcoating substrates or supports.

There still remains a need for catalysts and adsorbers in which the above disadvantages of abrasion, loss of strength and catalytic and adsorption efficiency are eliminated.

The present invention fills this need by providing a strong, highly porous host structure which can incorporate the additions of the active material such as carbon and zeolites into its pore structure. This then provides a substrate with the desired adsorption or catalytic properties which has sufficient strength without having to be raised to high temperatures once the active material has been introduced into the pore structure.

SUMMARY OF THE INVENTION

In accordance with one aspect of the invention, there is provided a method for producing a pore-impregnated body, which involves providing a multicellular support having cell walls separating the cells from one another, and pores in the cell walls, and an outer surface, wherein the cell wall porosity is greater than about 45% by volume, and wherein the cell wall porosity incorporates pores having an average pore diameter in the range of 15 to 30 micrometers, the support being made of material which can be ceramic, glass, glass-ceramic, cermet, metal, oxides, and combinations of these, providing a slurry of a liquid and a powdered active material, contacting the support with the slurry at subatmospheric pressure to substantially fill pores in the porous cell walls with the powdered active material, removing the excess slurry from the outer surface, and the non-pore surfaces of the cell walls, and drying the support to remove the liquid therefrom.

In accordance with another aspect of the invention there is provided a pore-impregnated body made up of a substantially continuous high strength multicellular support having cell walls separating the cells from one another, and pores in the cell walls, and an outer surface, and active material embedded in pores in the cell walls, the support being of material which can be ceramic, glass, glass-ceramic, cermet, metal, oxides, and combinations of these.

DETAILED DESCRIPTION OF THE INVENTION

Figure 1:
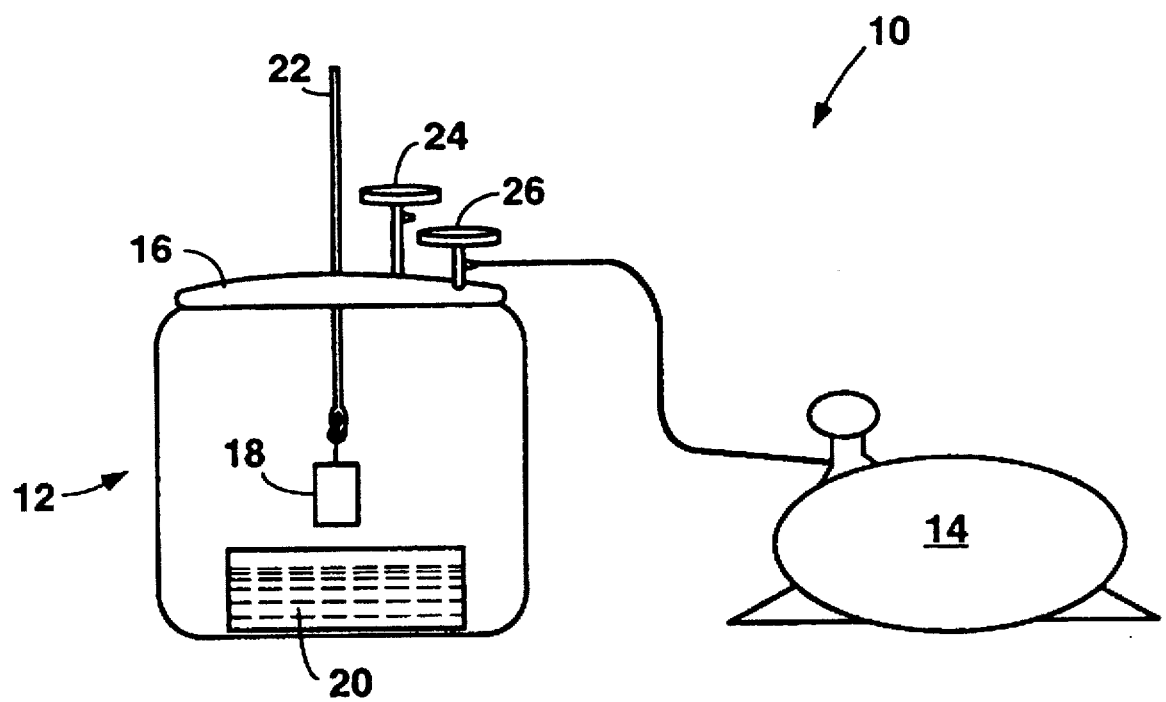
FIG. 1 is a schematic diagram illustrating a preferred system for practicing the present invention.

The present invention provides a method of producing a body made up of a continuous high strength porous support or substrate having active material embedded in its pores, and to a method of producing the body. Active material according to the present invention means material capable of compositionally modifying mixtures such as fluid work streams.

In general, the method involves contacting the substrate at subatmospheric pressure with a slurry of the active material to fill the open pores of the substrate with the active material.

The substrate by virtue of the material of which it is made contributes mechanical strength and good thermal properties to the body in the application. By virtue of its porosity, there is provided in the body enough space for containment of the active material therein. Because of the method of the present invention of loading the active material into the porosity, maximum use is made of the porosity because maximum or near-maximum loading of material is achieved.

The properties of high loading allow the bodies to function effectively as catalytic or adsorption devices without abrasion or flaking off which is sometimes encountered in conventional catalysts. Some of the contemplated uses for the bodies of the present invention are for auto exhaust conversion such as three-way catalysts and hydrocarbon adsorption, such as for cold start emissions, evaporative emissions, and volatile organic compounds (VOC), and in Denox applications.

The substrate materials are those that include as a predominant phase: ceramic, glass-ceramic, glass, cermet, metal, oxides, and combinations thereof. By combinations is meant physical or chemical combinations, e.g., mixtures, compounds, or composites. Some materials that are especially suited to the practice of the present invention, although it is to be understood that the invention is not limited to such, are those made of cordierite, mullite, clay, talc, zircon, zirconia, spinel, alumina, silica, borides, lithium aluminosilicates, alumina silica, feldspar, titania, fused silica, nitrides, borides, carbides, e.g., silicon carbide, silicon nitride or mixtures of these. Some typical ceramic substrates are disclosed in U.S. Pat. Nos. 4,127,691 and 3,885,977. Those patents are herein incorporated by reference as filed. Especially suited substrate materials are cordierite, mullite, and combinations thereof. Other types of bodies are porous metal bodies. Some preferred types of porous metal bodies, although it is to be understood that the invention is not limited to such, are bodies made of iron group metals such as, for example, Fe-Al or Fe-Cr-Al with optional additions for enhancement of various properties. For example, additions of oxides are included for enhancement of properties such as heat, corrosion, oxidation resistance, etc. Some porous metal bodies which are especially suited to the practice of the present invention are discussed in U.S. Pat. Nos. 4,758,272 and 4,992,233 and EPO application publication no. 488716A1, published Mar. 6, 1992 (U.S. patent application No. 07/767,889, filed Sep. 30, 1991, now U.S. Pat. No. 5,427,601) These patents and application are herein incorporated by reference as filed.

Although it is contemplated that the supports can be of any size and shape suitable to the application, the supports are most typically structures having a multiplicity of cells, preferred of which is a honeycomb structure. The cells are open ended and extend along the length of the support from one end to the other so that a workstream passes into one end and out the other end through the cells. The cells are separated from one another by walls having porosity and characteristic pore sizes. The support is characterized by an outer surface also referred to as the skin, enclosing the cell and cell wall matrix.

In general, the high strength substrate can have any degree of porosity from low to high depending on the application. However, in catalytic and adsorption applications, it is advantageous to have a relatively high porosity in order that the body hold a maximum or effective amount of active material. The porosity is the open porosity. When the bodies are honeycombs, the porosity is defined as that in the walls of the honeycomb, or wall porosity. Advantageously, the porosity of the substrate is at least about 45% by volume, and more advantageously about 45% to about 55% by volume, the latter being preferred especially for ceramic supports as cordierite and/or mullite.

In general, the substrate can have any degree of pore size. However, in catalytic and adsorption applications, it is advantageous to have an average pore size as determined by mercury porosimetry of about 15 to about 30 micrometers in diameter and more advantageously about 18 to about 27 micrometers in diameter. When the bodies are honeycombs, the porosity is defined as that in the walls of the honeycomb or wall pore size.

One especially suited support is made of cordierite and/or mullite, has a wall porosity of about 45% to 55% by volume and an average wall pore diameter of about 15 to 30 micrometers.

Some examples of honeycombs produced by the process of the present invention, although it is to be understood that the invention is not limited to such, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or about 15 cells/cm$^2$ (about 100 cells/in$^2$), or about 2.5 cells/cm$^2$, (about 16 cells/in$^2$) or about 1.5 cells/cm$^2$ (about 9 cells/in$^2$). These bodies are made preferably of, but not limited to materials which when fired form cordierite. Typical wall thicknesses in catalytic converter applications, for example, are about 0.15 mm (about 6 mils) for 62 cells/cm$^2$ (400 cells/in$^2$) honeycombs. Wall thicknesses range typically from about 0.1 to about 0.6 mm (from about 4 to about 25 mils).

The method of the present invention causes the active material to impregnate and substantially fill the wall pores without depositing any significant amount of material on the wall structure or on the outer skin where it would subject to abrasion as described previously.

Figure 2:
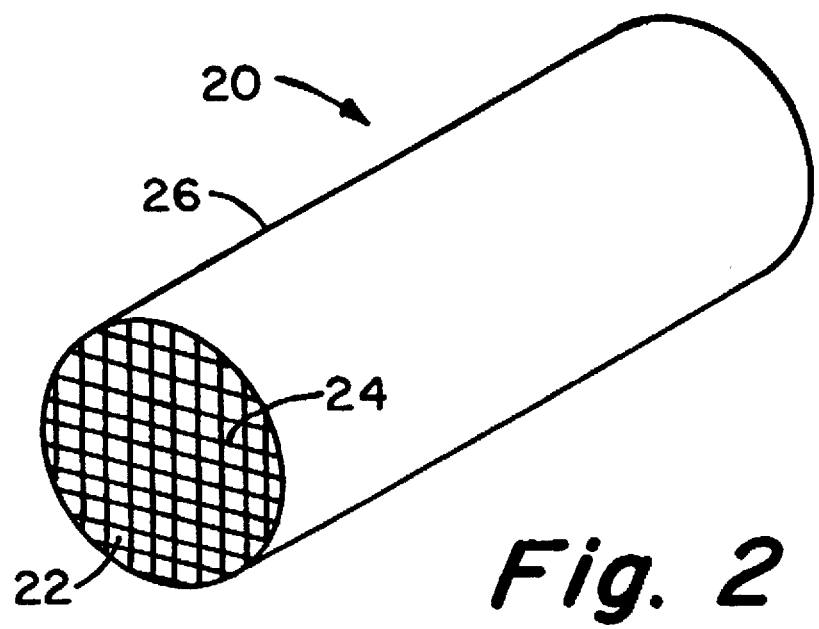
FIG. 2 is a schematic diagram showing a preferred support used in the practice of the present invention.

FIG. 2 shows the structure of a typical support used in the practice or the present invention. FIG. 2 is a schematic diagram showing a honeycomb structure (20) and the multiplicity of cells (22), and cell walls (24) and outer skin (26).

Figure 3:
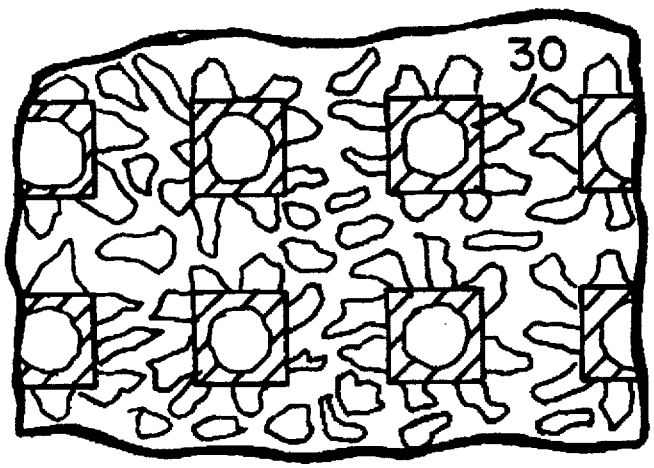
FIG. 3 is a schematic diagram showing a structure similar to that shown in FIG. 2a but having a coating on the cell walls as is done in prior art processes.
Figure 2A:
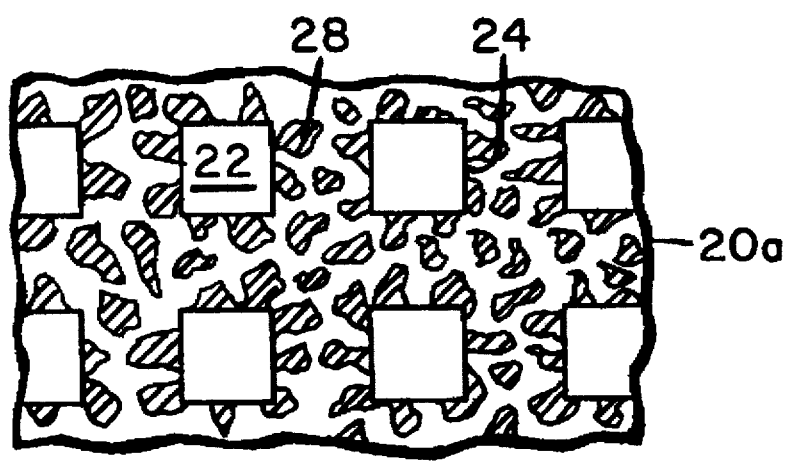
FIG. 2a is a schematic diagram showing an enlargement of a group of cells with the surrounding cell walls and plugged pores within the cells according to the present invention.

The difference between the plugging of pores according to this invention and prior coating methods is shown by a comparison of FIG. 2a with FIG. 3.

FIG. 2a shows how the major portion of the material is embedded in the pores according to this invention. FIG. 2a is a schematic diagram showing an enlargement (20a) of a group cells (22) with the surrounding cell walls (24) and pores (28) within the cells, the pores being plugged with active material according to the present invention. It can be seen that the pores would be in contact with a workstream passing through the cell, by virtue of their positioning within the cell walls, but at the same time would be protected from abrasion in harsh environments such as in the path of an automotive exhaust gas.

In contrast, FIG. 3 is a schematic diagram showing a structure similar to that shown in FIG. 2a but having a coating on the cell walls (30), as is done in prior art processes. The coating is more vulnerable to abrasion and erosion in harsh environments by virtue of its positioning on the wall structure as opposed to being firmly embedded in the wall pores.

The active material which is to impregnate the pores of the support can be any composition or combination of components, and/or precursors which either as is, or after heat-treatment are capable of compositionally modifying a mixture or work stream such as gas mixtures, by physical or chemical reactions.

In accordance with a preferred embodiment, the active material can be catalytic or sorbing material.

The sorbing material or sorbing agents take up and hold substances by either absorption or adsorption. In the practice of the present invention, a sorbing agent takes up or removes selected constituents from a gaseous mixture under certain conditions. These constituents can then desorb under certain conditions which are predetermined. The term "sorbing material" or "sorbing agent" as used in the present invention can mean one or a plurality of sorbing agents. Adsorption is the taking up of molecules by physical or chemical forces, termed respectively, physical or chemical adsorption. The term "adsorbing agent" according to the present invention means at least one adsorbing agent. There can be more than one type of adsorbing agent making up the active material. The specific adsorbers can vary depending on the application.

In accordance with a preferred embodiment, the bodies are designed for auto exhaust conversion applications such as hydrocarbon adsorption of cold start emissions and in three-way catalytic conversion.

For example, in auto exhaust conversion of hydrocarbons from cold start emissions, some typical adsorbing agents that are suitable are those that adsorb at relatively low temperatures and desorb at relatively high temperatures. For example, adsorbing agents that adsorb hydrocarbons at engine start-up temperatures which are typically less than about 150° C., and desorb at engine operating temperatures which are typically greater than about 150° C. are especially suited to the practice of the present invention.

Some typical adsorbing agents which are especially suited to the practice of the present invention are molecular sieves, activated carbon, transition aluminas, activated silicas, and combinations of these. The preferred adsorbing agents are molecular sieves, activated carbon, and combinations of these.

Activated carbon is advantageous in hydrocarbon adsorption applications, especially at lower temperatures such as room temperature to about 80° C.

Activated carbon is characterized by a very high surface area, generally above about 500 $m^2/g$, and more typically above about 1000 $m^2/g$, and a microstructure having a fissured surface and internal microporosity of pore sizes in the range of about 2 to about 10 or 15 angstroms, or larger if necessary. A primary tool for the characterization of activated carbon is BET surface area measurement using nitrogen adsorption.

The invention is not intended to be limited to any specific active material or use thereof. For example, activated carbon is known for its adsorption ability in a number of applications, and the body of the present invention can be used wherever feasible in any application. Depending on the application, the nature of the activated carbon can vary as far as particle size, surface area, adsorption capacity for hydrocarbons, adsorption efficiency, porosity, pore size, etc. The carbon can be a single type or a blend of types based on for example, precursor source, particle size, porosity, etc.

For hydrocarbon adsorption applications, the preferred type of activated carbon is what is considered to be a collection of very small graphitic platelets which are bound together with an open structure leading to high surface area.

One source of activated carbon suitable for use in this invention is BPL F3 granular activated carbon available from Calgon Carbon Corp. which is available in several particle size ranges. A particular preferred variety of activated carbon from this source is the "6×16" mesh size, which can have a surface area of about 1050 to about 1300 $m^2/g$. Another suitable carbon is supplied by Rohm and Haas under the name of Ambersorb®. The particle size of the carbon must be smaller than the pore size of the substrate to allow it to enter the porosity of the substrate. The median particle diameter of the activated carbon after grinding is typically about 2 to about 6 micrometers as present in the slurry.

Molecular sieves are crystalline substances having pores of size suitable for adsorbing molecules.

Some types of molecular sieves which are preferred for the practice of the present invention are carbon molecular sieves, zeolites, aluminophosphates, metallophosphates, silicoaluminophosphates, and combinations of these.

Carbon molecular sieves have well defined micropores made out of carbon material.

The preferred molecular sieves are zeolites. Some preferred zeolites are faujasite type, especially preferred of which is ultra stable Y, preferably with $SiO_2/Al_2O_3$ mole ratios of greater than about 5, pentasil type, preferred of which are ZSM type such as ZSM-5 most preferred of which have $SiO_2/Al_2O_3$ mole ratios of greater than about 25, and mordenite, and beta, and combinations of these. Depending on the silica/alumina ratio, zeolites can adsorb mainly by physical adsorption or a combination of physical and chemical adsorption. In physical adsorption, the adsorbents weakly hold the adsorbed species within or on their structure. Species that are physically adsorbed, desorb at relatively low temperatures, e.g., room temperature or moderate temperatures. In chemical adsorption, the adsorbents strongly hold the adsorbed species within their structure. Species that are chemically adsorbed, desorb at relatively high temperatures i.e., typically above room temperature. (Low and high temperatures are strictly relative terms).

A zeolite can be used as formed or ammoniated, but is preferably in the $H^+$ form, or ion exchanged with an alkaline earth metal or with a transition metal, e.g. of atomic number 21 thru 79, as a noble metal, e.g., Pt or Pd, etc., as is known in the art depending on the adsorption or conversions which are desired. The zeolite can be ion exchanged before incorporating it into the slurry, or it can be ion exchanged in the slurry by contacting it with a solution e.g., a salt solution of the appropriate metal or metals as is known in the art. Or it can be ion exchanged after it is embedded in the substrate. In the latter case, the zeolite-embedded substrate is contacted with a solution of the metal(s).

An especially advantageous adsorbing agent for hydrocarbon adsorption applications is a combination of activated carbon and zeolite. This combination is advantageous because the activated carbon adsorbs hydrocarbons at lower temperatures and the zeolite adsorbs at higher temperatures. Therefore, if the combined adsorber is contacted with a work stream, the zeolite can retain some or most of the hydrocarbons which may start to desorb from the activated carbon. The preferred zeolite is ZSM-5, an excellent high temperature adsorbing agent for hydrocarbons.

The combination of activated carbon and zeolite is especially suited for auto exhaust conversion applications. The combined activated carbon and zeolite extend the adsorption temperature range for hydrocarbon adsorption until the catalyst light-off temperature is reached. (The light-off temperature is the temperature at which the catalyst can convert 50% of the pollutants to innocuous products. The activated carbon is needed for initial cold start emissions and a higher temperature adsorber, the zeolite, is utilized when the auto engine is approaching light-off temperature, e.g., $\geq 150°$ C.

Catalyst material according to the present invention is a highly dispersed catalyst metal or catalyst metal oxide on any species of active material, for example on molecular sieve as zeolite, and/or activated carbon. Catalyst material includes also molecular sieves, such as zeolites with or without a metal or metal oxide, when used in conversions such as, e.g., in cracking of hydrocarbons or oxidation, etc.

The active material can include a catalyst for conversion of $NO_x$, CO, and hydrocarbons to innocuous products. In the conversion of auto exhaust, some catalysts, that is, oxidation or three-way, that are especially suited to the practice of the present invention are transition metals having atomic numbers 21 thru 79. Noble metals, e.g., Pt, Pd, and Rh, on substrates such as oxides, e.g., alumina, silica, zirconia, titania, rare earth oxides such as ceria and lanthana, or incorporated into molecular sieves, or any combinations of these components are commonly used catalysts which can be used in the practice of the present invention. In the case of molecular sieves, the molecular sieve or zeolite can function also as an adsorbing agent. The oxidation catalyst serves to oxidize the hydrocarbons mainly, to innocuous products as carbon dioxide and water, which are suitable for passing into the atmosphere.

The active material can be a Denox catalyst, that is a catalyst for converting $NO_x$ to innocuous products such as $N_2$.

A $NO_x$ conversion catalyst that is especially suited to the practice of the present invention is one that catalyzes the reaction of ammonia with $NO_x$ to produce $N_2$ as in stationary power plants. The ammonia is premixed with the $NO_x$-containing gas stream prior to being passed into the body. The ammonia-$NO_x$ mixture passes into the body into the loaded pores for conversion to $N_2$ by the catalyst embedded therein.

In the above applications the catalyst which is filling the pores can be any known SCR catalyst such as zeolite-based catalysts having transition metal or metals ion exchanged. Some preferred catalysts are Fe mordenite, Cu mordenite, ZSM-5 $H^+$ form, and $V_2O_5/TiO_2$.

The support or substrate is contacted with the active material at subatmospheric pressure to fill the open porosity of the substrate with the active material as described below.

A slurry is formed of the active material and a medium.

The slurries are typically aqueous slurries, although this is not necessary. Other slurry media such as alcohols, trichloroethane, trichloroethylene, ethyl acetate, etc. which are well-known in the art can be used.

It is to be understood that the nature of the slurry is not limited. It is well-known in the art how to make up slurries of the previously described active materials.

Other components can be present in the slurry, as necessary to impart handleability properties, e.g., rheological modifiers, or to promote changes in the material to render it suitable for the particular reactions which it is to undergo in the application, as is known in the art. For example, acids such as nitric acid, chloroacetic acid, etc., and surfactants such as Surfanol, Emphos21A, Triton x-100 can be added to disperse the solid particles in the medium. To evaluate effectiveness of these additions, viscosities of the slurries can be measured with no additives and then with incremental values of the additives.

Binders can be present in the slurry to promote interparticle adhesion after pore impregnation. The binders can be for example, alumina, silica, and titania precursors. Alumina precursors include but are not limited to hydrated alumina such as boehmite, colloidal alumina such as supplied by Nyacol Company. Silica precursors can be silicone resins, colloidal silica, e.g., Ludox HS-40 colloidal silica (DuPont, 40 wt. % solids) etc. Titania precursors can be tetraisopropyl titanate, etc.

Some non-limiting examples of slurries are carbon, zeolites, mixtures of carbon and zeolites, precious metal ion.-exchanged zeolites, base metal ion-exchanged zeolites, mixtures of base metal ion-exchanged zeolites with alumina, silica and/or titania precursor binders in aqueous media.

For the carbon, and/or zeolite slurries, the solids content is typically but not exclusively about 25% to about 40% by weight. The percent binder usually varies from about 1% to about 15% by weight. Acid additions depend on the final pH desired. Other additions are usually <1 wt %. It is to be understood that the various compositions of the slurries can vary depending on the materials, etc., without departing from the scope of the invention.

In accordance with one embodiment, the slurry is made of activated carbon powder and water. A typical carbon slurry is prepared with about 85 to about 95 wt % carbon and about 5% to about 15 wt % binder precursor such as hydrated alumina e.g., boehmite, or silica in water (preferably distilled) and a solids/media weight ratio of typically about 1/2, although this can vary. The mixture is ball milled for about 18 hours and acid is added to disperse the carbon in water.

In accordance with another embodiment, the slurry is composed of a zeolite, e.g., ZSM-5 zeolite, and water. A typical zeolite slurry is prepared with about 85% to about 95 wt % zeolite and about 5% to about 15 wt. % binder precursor such as colloidal alumina or silica in water (preferably distilled) and a solids/media weight ratio of typically about 1/1, although this can vary. The mixture is ball milled for about 2 hours and surfactant is added to disperse the zeolite in water.

In accordance with another embodiment, the slurry is composed of and zeolite, e.g., ZSM-5 zeolite, activated carbon, and water. This is done typically by first preparing individual slurries of the carbon and the zeolite as described above, and thereafter combining the slurries into one.

The support is contacted with the slurry at subatmospheric pressure to substantially fill the open pores of the support with the active material. Again, the contacting can be done by any method or technique which brings the slurry and support together under subatmospheric pressures.

In accordance with a preferred embodiment, the contacting is done by first introducing the support and slurry into a chamber at atmospheric pressure. Air is then evacuated from the chamber to create subatmospheric pressure in the chamber and therefore in the pores of the support. It is understood that the greater the amount of air removed, the more complete the subsequent impregnation can be. Typically, the major portion of the air in the chamber, that is greater than about 50 vol %, is evacuated from the chamber. Preferably greater than about 80% by volume of the air is evacuated. In other words, the absolute pressure in the partially evacuated chamber is preferably no greater than about 150 mmHg. The support is then immersed in the slurry at the subatmospheric pressure to allow a portion of the slurry to enter the wall pores of the support. Air is then introduced back into the chamber to force material into pores and to allow a period of time within which the chamber equilibrates to atmospheric pressure. In order to ensure that the material is securely and firmly fixed in the pores, the support with the material can be resubjected to subatmospheric pressure to introduce more material into the pores and to further pack all the material into the pores. However, this is done most typically after the drying step for better packing efficiency.

This procedure is best understood by referring to FIG. 1 which is a schematic diagram of a preferred system for carrying it out.

In FIG. 1 is shown the system (10) which is composed of a vacuum chamber (12) and a pump (14). Lid (16) fits over the vacuum chamber. The support (18) and the slurry (20) are placed inside the chamber which at this point is at atmospheric pressure. Typically the support is suspended in the chamber by suspending means such as a suspension rod (22). Vacuum air valve (24) on the chamber is closed. The vacuum pump connected to valve (26) on the chamber is turned on to evacuate most of the air from the chamber. The substrate, aligned with the slurry is then lowered into the slurry. By capillary action, aided by the subatmospheric pressure, some slurry enters the pores of the support. The vacuum line is then closed and the vacuum air valve is opened to allow air to re-enter the chamber and the pressure inside the chamber to equilibrate to atmospheric pressure. Air pushes the slurry into the pores so that the material is packed therein.

The pore-embedded support can then be processed to remove excess slurry from the non-pore surfaces. This can be done by blowing the slurry off with a stream of air. This is especially useful when the support is a honeycomb, to remove the slurry from the honeycomb channels. Or the support can be washed with water or other solvents. The specific removal conditions can be designed depending on the specific geometry of the body. The material that is embedded in the pores will remain fixed in the pores during the removal of the excess material.

The pore-embedded support is then dried to remove the slurry medium therefrom.

The evacuation, embedding, and drying procedures just described can be repeated for the purpose of introducing more material into the pores and/or more firmly packing the already embedded material in the pores. When it has been determined that sufficient material has been loaded or embedded in the pores, the support with the material embedded in the pores can then be removed from the chamber by opening the lid and detaching it from the suspension device.

The pore-embedded support can be subjected to a heat-treating step if necessary to convert any precursors to the catalytic material. For example, a slurry of alumina precursors can be heat-treated at temperatures of about 550° C. to about 750° C. to convert precursors as boehmite to gamma alumina which serves as a binder for zeolites, or support catalyst metals, etc.

One especially preferred body of the present invention is a support of cordierite and/or mullite having a wall porosity of about 45% to 55% by volume and an average wall pore diameter of about 15 to 30 micrometers, and activated carbon and/or zeolite embedded in the wall pores.

To more fully illustrate the invention, the following non-limiting examples are presented. All parts, portions, and percentages are on a weight basis unless otherwise stated.

Examples 1 through 6 are examples of preparation of carbon pore-impregnated honeycombs.

Example 1

A slurry of about 95% carbon about 5% binder was prepared in about a 200 part batch as follows. About 190 parts of Calgon BPL F3 granulated activated carbon having an average particle size of about 7–9 micrometers in diameter, (Microtrac particle size analyzer) and a surface area of about 1090 $m^2$/g, (5 pt. $N_2$ BET), about 50 parts of Nyacol Al-20 colloidal alumina binder, (about 20% solids), about 600 parts of distilled water and about 400 parts of 0.6 cm (about ¼") diameter cylindrical alumina balls were combined together in a container. The solids/media ratio was about 1/2. The mixture was ball milled for about 18 hours. After ball milling, about 7.5 parts of concentrated nitric acid was added to disperse the carbon in the slurry medium. (Alternately, the acid could have been added before the ball milling step.) The average particle size of the carbon in the slurry was reduced to about 2 to about 5 micrometers in diameter.

Pore infiltration process

A porous cordierite honeycomb measuring about 2.54/cm (about 1") in diameter and about 2.54 cm (about 1") in length and having about 31–62 cells/$cm^2$ (about 200–400 cells/$in^2$), and a pore size diameter of about 16–21 micrometers and Hg porosity of about 45% to about 55% is suspended on a wire attached to a suspension rod in a vacuum chamber as shown in FIG. 1. A container filled with the carbon slurry is placed in the bottom of the chamber. The vacuum air valve is closed and the vacuum pump is turned on until a pressure of less than about 150 mm Hg is attained. This pressure is held for at least about 60 seconds to allow as much air to escape the pores as possible. The suspension rod is slowly lowered until the honeycomb is immersed in the slurry. The vacuum pump is turned off. The chamber is pressurized by opening of the vacuum air valve. The air forces slurry into the evacuated pores. The honeycomb is soaked in the slurry for about 60 seconds. The honeycomb soaked with the slurry is then removed from the chamber and rinsed with distilled water to remove excess slurry from the honeycomb channels. The channels are then cleared by blowing high pressure air through them. The resulting carbon infiltrated honeycomb is dried in an oven at about 150° C. for about 15 minutes. The pore infiltration process is repeated until the desired loading of carbon into the pores is attained (about 10–25%) based on the initial weight of the honeycomb.

Example 2

A slurry of about 85% carbon about 15% binder was prepared in about a 200 part batch using about 170 parts of Calgon carbon and about 150 parts of Nyacol Al-20 colloidal alumina and impregnated into the pores of a honeycomb support as in Example 1.

Example 3

A slurry of about 95% carbon about 5% binder was prepared in about a 200 part batch as follows. About 190 parts of Ambersorb® carbon (Rohm and Haas) having an average particle size of about 6–8 micrometers in diameter, and a surface area of about 475 $m^2$/g, (5 pt. $N_2$ BET), about 50 parts of Nyacol Al-20 colloidal alumina, (about 20 wt. % solids), about 600 parts of distilled water and about 400 parts of 0.6 cm diameter (about ¼") cylindrical alumina balls were combined together in a container. The solids/media ratio was about 1/2. The mixture was ball milled and nitric acid was added as in Example 1. The slurry was impregnated into the pores of a honeycomb as in Example 1.

Example 4

A slurry of about 85% carbon about 15% binder was prepared in about a 200 part batch using about 170 parts of Ambersorb® carbon and about 150 parts of Nyacol Al-20 colloidal alumina and impregnated into the pores of a honeycomb as in Example 1.

Example 5

A slurry of about 85% carbon and about 15% binder was prepared in about a 200 part batch using about 170 parts of Calgon carbon, about 75 parts of Ludox HS-40 colloidal silica (DuPont, 40 wt. % solids), and impregnated into the pores of honeycomb as in Example 1.

Example 6

A slurry of about 95% carbon and about 5% binder was prepared in about a 200 part batch using about 190 parts of Calgon carbon, about 25 parts of Ludox HS-40 colloidal silica (DuPont, 40 wt. % solids), and impregnated into the pores of honeycomb as in Example 1. Examples 7 through 11 are examples of preparation of zeolite pore-impregnated honeycombs.

Example 7

A slurry of about 95% zeolite/about 5% binder was prepared in about a 200 part batch as follows. About 190 parts of ZSM-5 zeolite (Conteka CBV 2802, Si/Al mole ratio of about 280/1, surface area of about 379 $m^2$/g (5 pt. $N_2$ BET), and an average particle size of about 2–5 micrometers in diameter (Microtrac particle size analyzer) about 50 parts of Nyacol Al-20 colloidal alumina, (about 20 wt. % solids), about 300 parts of distilled water and about 200 parts of 0.6 cm diameter (about ¼") alumina balls were combined together in a container. The solids/media ratio was about 1/1. The mixture was ball milled for about 2 hours. After ball milling, about 0.42 parts of Surfanol 485 surfactant was added to disperse the zeolite in the water. (Alternately, the surfactant could have been added before the ball milling step.) The slurry was impregnated into the pores of a honeycomb as in Example 1. The pore infiltration process is repeated until the desired loading of zeolite into the pores is attained (about 10–30%) based on the initial weight of the honeycomb. The zeolite pore-impregnated honeycomb is heat treated in air at about 550° C. for about 3 hours.

Example 8

A slurry of about 85% zeolite/about 15% binder was prepared in about a 200 part batch using about 170 parts of ZSM-5 zeolite about 50 parts of Nyacol Al-20 colloidal alumina and impregnated into the pores of a honeycomb as in Example 7.

Example 9

A slurry of about 90% zeolite/about 10% binder was prepared in about 200 part batch using about 180 parts of ZSM-5 zeolite (Mobil MZ-12, Si/Al mole ratio of about 55/1, surface area of about 352 $m^2$/g and an average particle size of about 2–5 micrometers in diameter), about 100 parts of Nyacol Al-20 colloidal alumina and impregnated into the pores of a honeycomb as in Example 7.

The pore impregnated honeycomb sample 31 cells/$cm^2$ (200 cells/$in^2$), with about 25% zeolite (based on wt. of honeycomb substrate was tested for Denox SCR activity under the following conditions, the quantities being based on volume: $NO_x$=about 500 ppm, $NH_3$=about 500 ppm, $O_2$=4, Bal=$N_2$, space velocity 10,000 volume changes per hour, and temperature 100°–600° C. The conversion efficiency of $NO_x$ (Beckman Model 951A NO/$NO_x$ Analyzer) was about 65–72% in the temperature range of about 480°–550° C.

Example 10

A slurry of about 95% zeolite and about 5% binder was prepared in about a 200 part batch using about 190 parts of ZSM-5 zeolite (Conteka CBV 2802, Si/Al mole ratio of about 280/1) about 25 parts Ludox HS-40 colloidal silica binder (40 wt. % solids) and impregnated into the pores of a honeycomb as in Example 7.

Example 11

A slurry of about 85% zeolite and about 15% binder was prepared in about a 200 part batch using about 170 parts of ZSM-5 zeolite (Mobil MZ-12, Si/Al mole ratio of about 55/1, about 75 parts Ludox HS-40 colloidal silica (40 wt. % solids) and impregnated into the pores of a honeycomb as in Example 7.

Example 12

The following is an example of preparation of a combination of carbon and zeolite pore-impregnated honeycomb.

A slurry of about 45% carbon and about 45% zeolite/ about 10% binder was prepared in about a 200 part batch as follows. About 90 parts Calgon carbon, about 50 parts of Nyacol Al-20 colloidal alumina binder, about 300 parts of distilled water and about 200 parts of 0.6 cm diameter (about ¼") cylindrical alumina balls were combined in a container. The solids/media ratio was about 1/2. The mixture was ball milled for about 18 hours. After ball milling, about 4 parts of concentrated nitric acid was added to disperse the carbon in the slurry medium. A second slurry of about 90 parts of ZSM-5 zeolite (Conteka CBV 2802), about 50 parts of Nyacol Al-20 colloidal alumina binder, about 150 parts of distilled water and about 100 parts of 0.6 cm diameter (about ¼") cylindrical alumina balls were combined together in a container. The solids media ratio was about 1/1. The mixture was ball milled for about 2 hours. After ball milling about 0.21 parts of Surfanol 485 surfactant was added to disperse the zeolite in the water. After ball milling, the alumina balls were removed from the slurry. The two slurries were combined and roller milled for at least 2 hours for thorough mixing and impregnated into the pores of a honeycomb as in Example 1.

Example 13

Rh ion-exchanged zeolite

The following is an example of preparation of an ion-exchanged zeolite pore-impregnated honeycomb. A ZSM-5 zeolite pore-impregnated honeycomb was prepared as in Example 7 and was ion exchanged with rhodium as follows. A zeolite pore-impregnated honeycomb was immersed in a solution of about 0.01M aqueous solution of Rh($NO_3$)$_3$ (Englehard) under gentle reflux at about 80° C. with stirring for about 4 hours. After heating, the ion-exchanged zeolite was rinsed with deionized water, dried in air at about 110° C. for about 8 hours and heat treated in air at about 550° C. for about 6 hours. The rhodium addition is about 0.42 wt. % (Rh metal). The desired Rh exchange can be adjusted by varying the Rh($NO_3$)$_3$ solution concentration.

Example 14

Pt ion-exchanged zeolite

A ZSM-5 zeolite pore-impregnated honeycomb was prepared as in Example 7 and was ion exchanged with ($NH_3$)$_4$Pt$Cl_2$ (Englehard) according to the procedure described in Example 13. The platinum exchange is about 0.6 wt. % (Pt metal). The desired Pt exchange can be adjusted by varying the Pt salt concentration.

Example 15

Pd ion-exchanged zeolite

A ZSM-5 zeolite pore-impregnated honeycomb was prepared as in Example 7 and was ion exchanged with Pd(NH$_3$)$_4$(NO$_3$)$_2$ (Englehard) according to the procedure described in Example 13. The palladium exchange is about 0.6 wt. % (Pd metal). The desired Pt exchange can be adjusted by varying the Pd salt concentration.

Example 16

Pt ion-exchanged zeolite powder

Alternately, the zeolite powder can be ion-exchanged before pore-impregnation as follows. About 100 grams of ZSM-5 zeolite (NH$_4$-Conteka 2802) in about 400 ml of an aqueous 0.01M (NH$_3$)$_4$PtCl$_2$ solution was refluxed gently at about 80° C. for about 4 hours with constant agitation. The exchanged zeolite was filtered, washed several times with deionized water by centrifugation for about 15 minutes at about 7000 rpm, dried in air at about 110° C. for about 8 hours and calcined in air at about 550° C. for about 6 hours. The Pt exchanged zeolite was pore-impregnated into a honeycomb as in Example 7. Similarly, Rh(NO$_3$)$_3$ and Pd(NH$_3$)$_4$(NO$_3$)$_2$ exchanged zeolite powders were prepared and pore-impregnated into a honeycomb.

Example 17

Pt and Rh zeolite honeycomb

A mixture of Pt and Rh ion-exchanged zeolites prepared as in Example 16 can be pore-impregnated into a honeycomb and function as a three-way automotive catalyst.

Example 18

Fe ion-exchanged zeolite

A ZSM-5 zeolite pore-impregnated honeycomb can be prepared as in Example 7 and can be ion-exchanged with iron as follows. A zeolite pore-impregnated honeycomb was immersed in a solution of about 0.1M aqueous solution of Fe(NO$_3$)$_3$ under gentle reflux at about 80° C. with agitation for about 4 hours. After heating, the ion-exchanged zeolite was rinsed with deionized water, dried in air at about 110° C. for about 8 hours and heat treated in air at about 500° C. for about 6 hours. The desired Fe exchange can be adjusted by varying the Fe(NO$_3$)$_3$ solution concentration. Alternately, the zeolite powder can be pre ion-exchanged before pore-impregnation as in Example 16. The Fe-exchanged zeolite can be used as a Denox catalyst.

Example 19

Cr ion-exchanged zeolite

A ZSM-5 zeolite pore-impregnated honeycomb can be prepared as in Example 7 and can be ion-exchanged with chromium as in Example 18 using a 0.1M aqueous solution of Cr(NO$_3$)$_3$. The desired Cr exchange can be adjusted by varying the Cr(NO$_3$)$_3$ solution concentration. The Cr-exchanged zeolite can be used as a Denox catalyst.

Example 20

C ion-exchanged zeolite

A ZSM-5 zeolite pore-impregnated honeycomb can be prepared as in Example 7 and can be ion-exchanged with copper as in Example 18 using a 0.1M aqueous solution of Cu(NO$_3$)$_2$. The desired Cu exchange can be adjusted by varying the Cu(NO$_3$)$_2$ solution concentration. The Cu-exchanged zeolite can be used as a Denox catalyst.

Example 21

Several of the pore-impregnated honeycombs from the previous examples were tested for propylene adsorption by the following procedure.

For catalytic evaluation, the pore-impregnated honeycomb sample is contained in a Vycor tube with an inside diameter of about 25 mm. This in turn, is inserted in a stainless steel furnace tube (about 3.5 cm I.D. by about 81.4 cm length). The efficiency for hydrocarbon adsorption is measured by passing the appropriate gas mixture (Table 1) through the sample at about 25° C. (alternately, the sample can be heated). The gas stream then passes through a hydrocarbon analyzer (Beckman Model 400A Hydrocarbon Analyzer, FID detector) which determines the amount of hydrocarbon adsorbed in the first 0–3 minutes The conditions under which the efficiency of hydrocarbon adsorption is determined are given in Table 1.

TABLE 1

Experimental Conditions For Propylene Adsorption:

| | |
|---|---|
| C$_2$H$_6$ | = 500 ppm |
| NO$_x$ | = 1000 ppm |
| CO | = 1% |
| O$_2$ | = 0.77% |
| CO$_2$ | = 14% |
| H$_2$ | = 0.33% |
| N$_2$ | = Bal. |
| Space velocity | = 50,000 volume changes/hr |
| Temp. | = 25° C. |

Sample size=2.54 cm diameter×2.54 cm length, and about 31 cells/cm$^2$.

The examples shown in Table 2 are preparations of typical pore-impregnated honeycombs described in Examples 1, 3, 8, and 12. The carbon, zeolite, and binder loadings (slurry pick-up after drying or heat treatment) and weight percent based on the initial weight of the honeycomb are given in Table 2. The adsorption of propylene (in mg) during the initial 0–3 minutes of adsorption is also shown in Table 2. The adsorption results for pore-impregnated zeolites is at least comparable with similar weight percent loadings of zeolites washcoated on cordierite honeycombs without abrasion and flaking off that is associated with these conventional catalysts. The pore-impregnated honeycombs are efficient for hydrocarbon adsorption and have potential use for removal of automotive cold start emissions.

TABLE 2

Propylene Adsorption

| Example # | Composition | Loading | Wt. % | 0–3 min Ads |
|---|---|---|---|---|
| Carbon Pore-Impregnated Honeycomb. | | | | |
| 1 | 95% Calgon/15% Alumina | 1.22 g | 18% | 5.09 mg |
| 1 | 95% Calgon/15% Alumina | 1.13 g | 15% | 5.93 mg |
| 3 | 95% Ambersorb/15% Alumina | 0.95 g | 13% | 6.54 mg |
| Zeolite Pore-Impregnated Honeycomb | | | | |
| 8 | 85% ZSM-5/15% Alumina | 1.93 g | 26% | 7.72 mg |
| 8 | 85% ZSM-5/15% Alumina | 1.87 g | 26% | 7.30 mg |
| Zeolite And Carbon Combined Pore-Impregnated Honeycomb | | | | |
| 12 | 45% Calgon/45% ZSM-5 10% Alumina | 1.47 g | 21% | 6.54 mg |

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for producing a pore-impregnated body, the method comprising:

a) providing a multicellular support having cell walls separating the cells from one another, and pores in the cell walls, and an outer surface, wherein the cell wall porosity is greater than about 45% by volume, and wherein the cell wall porosity incorporates pores having an average pore diameter in the range of 15 to 30 micrometers, the support being made of material selected from the group consisting of ceramic, glass, glass-ceramic, cermet, metal, and combinations thereof;

b) providing a slurry comprising a liquid and a powdered catalytically active or sorbent material having a particle size smaller than the pore size of the substrate;

c) contacting the support with the slurry at subatmospheric pressure to fill pores in the porous cell walls with the powdered active material by the steps of
  i) introducing the support and the slurry into a chamber at atmospheric pressure,
  ii) evacuating a portion of the air from the chamber to reach a sub-atmospheric pressure of about 75 to 100 mm of Hg herein,
  iii) immersing the support in the slurry at the subatmospheric pressure to allow a portion of the slurry to enter the pores in the cell walls of the support, and
  iv) introducing air back into the chamber to force the slurry into the pores;

d) removing the slurry from the outer surface, and the non-pore surfaces of the cell walls; and e) drying the support to remove the liquid from the slurry therefrom.

2. A method of claim 1 wherein the support is made of ceramic material.

3. A method of claim 2 wherein ceramic support is composed of material is selected from the group consisting of cordierite, mullite, and combinations thereof.

4. A method of claim 3 wherein the wall has a porosity of up to 55% by volume.

5. A method of claim 1 wherein the active material comprises activated carbon, zeoliter and combinations thereof.

6. A method of claim 5 wherein the catalytically active material further comprises a metal or metal oxide catalyst.

* * * * *